United States Patent [19]
Heim et al.

[11] Patent Number: 4,986,864
[45] Date of Patent: Jan. 22, 1991

[54] PAGE BINDING METHOD AND MACHINE

[75] Inventors: Frederick L. Heim; Mark Becker, both of St. Cloud; Craig A. Dullinger, Avon; Edward J. Gnifkowski, Sauk Rapids; Roger M. Gohl, Clear Lake; John D. Weber, St. Cloud, all of Minn.

[73] Assignee: Webway Incorporated, St. Cloud, Minn.

[21] Appl. No.: 333,518

[22] Filed: Apr. 5, 1989

[51] Int. Cl.$^5$ .............................................. B32B 31/18
[52] U.S. Cl. .................... 156/201; 156/202; 156/204; 156/250; 156/461; 156/464; 156/522; 156/552; 156/566; 156/569; 40/159
[58] Field of Search ............... 156/201, 202, 204, 301, 156/302, 250, 264, 461, 464, 467, 522, 552, 566, 569; 40/159

[56] References Cited

U.S. PATENT DOCUMENTS

| | | | |
|---|---|---|---|
| 1,776,255 | 9/1930 | Frontz | 156/464 |
| 2,761,487 | 9/1956 | Ware | 156/552 |
| 2,772,717 | 12/1956 | Ware | 156/552 |
| 3,135,644 | 6/1964 | Coplen et al. | 156/461 |
| 3,620,882 | 11/1971 | Chou et al. | 156/202 |
| 3,735,516 | 5/1973 | Wenstrom | 40/159 |
| 4,462,854 | 7/1984 | Wenstrom et al. | 156/250 |

*Primary Examiner*—Caleb Weston
*Attorney, Agent, or Firm*—Biebel, French & Nauman

[57] ABSTRACT

Apparatus for manufacturing, on an automatic continuous basis, successive album pages of predetermined length and width each of which consists of a base sheet having a reinforcing tape bound thereto in overlapping relation with each edge thereof comprises a series of five stations: a tape preparing station, a sheet loading station, a glue station, a page assembly station and a cut-off station. In operation, one of two tapes has staple-like hinges applied thereto, both tapes are coated on one surface with glue, and both tapes advance to the assembling station to which successive sheets are fed lengthwise from the sheet loading station. In passing through the page assembling station, the tapes are folded and pressed into overlapping adhered relation with the side edges of the sheet to form a web consisting of a series of pages held together by intermediate pieces of the two tapes. The tapes, the successive sheets and the resulting web are drawn through the apparatus by a reciprocating carriage. During forward feeding movement of the carriage, the web is clamped to the carriage, and during each return stroke of the carriage, the tape is clamped to the cut-off station while the pieces of tape connecting the leading page to the remainder of the web are cut out to leave that page free for further disposal. The apparatus is adjustable to accommodate sheets of different lengths and widths.

19 Claims, 12 Drawing Sheets

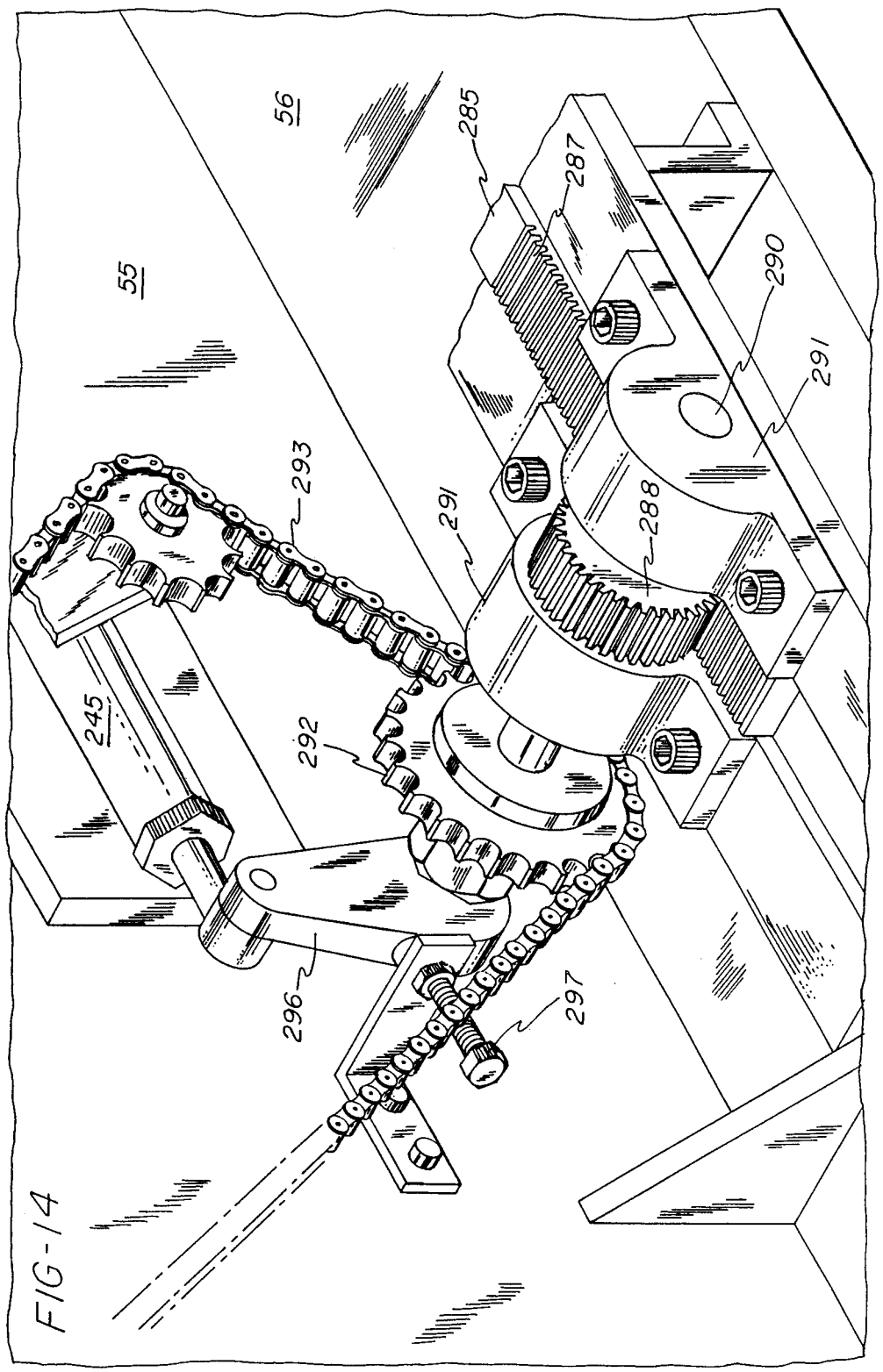

PAGE BINDING METHOD AND MACHINE

BACKGROUND OF THE INVENTION

This invention relates to a machine and method for binding individual pages for subsequent assembly in an album, such as a looseleaf photograph album.

The type of page with which the invention is particularly concerned comprises a sheet of paperboard having a plurality of pockets on one or both surfaces thereof for retaining photographs or cards. Each of the pockets is formed by a sheet of clear plastic adhered or otherwise secured along its side and bottom edges to the surface of the base sheet, and a typical such album page is shown in the co-owned Wenstrom U.S. Pat. No. 3,735,516. This patent also shows such an album page having reinforcing tapes overlapping and bonded to the side edges of the sheet, with one of these reinforcing tapes also serving as a mounting for a plurality of U-shaped staples that form hinges by which multiple sheets are bound in an album.

The economical production of multiple pages of this type has offered problems to the industry in the past. One attempt to solve those problems is disclosed in the co-owned Chou et al U.S. Pat. No. 3,620,882. In the machine of that patent, staples are applied to reinforcing tape for one side edge of successive album pages, adhesive on one surface of the tape is activated, individual sheets are manually fed into assembled relation with the tape, the assembled sheet and tape are pressed together, and successive assembled sheets and tape are advanced to a cut-off station where the tape is severed. In order to apply reinforcing tape to the other side edge of the resulting page, it must be passed through the machine a second time for assembly with tape to which no staples have been applied.

Machines constructed in accordance with the above patent have been used to produce satisfactory products, but such machines are relatively slow in operation, which correspondingly reduces the rate at which they produce the album pages. They also are highly labor-intensive in that they require constant activity by relatively skilled labor to carry out the manual operations of individually loading, unloading and reloading each successive sheet.

SUMMARY OF THE INVENTION

The objective of the present invention is to provide a binding machine and method for use in the manufacture of album pages as summarized above on a high volume output basis without requiring hand labor or other attention except to make certain that the machine is at all times supplied with adequate quantities of tapes, staple wire, glue and sheets to be bound. Stated more specifically, a primary object of the invention is to provide a machine for the above purpose which will automatically and at relatively high speed draw a pair of reinforcing tapes, staple wire and successive preformed sheets from supply stations which form parts of the machine, secure the tapes simultaneously to the opposite sides of each successive sheet to form a web comprising completed album pages of consistently high quality connected by the tapes, and periodically sever the tapes connecting the leading page with the remainder of the web.

Details of the means and method steps by which these objects are achieved, as well as other objects and advantages of the invention, will be apparent from or pointed out in the course of the description of the preferred embodiment of the invention which follows.

BRIEF DESCRIPTION OF THE DRAWINGS

FIG. 14 is a fragmentary perspective view illustrating part of the drive for the cut-off station.

DESCRIPTION OF THE PREFERRED EMBODIMENT

Figure 1:
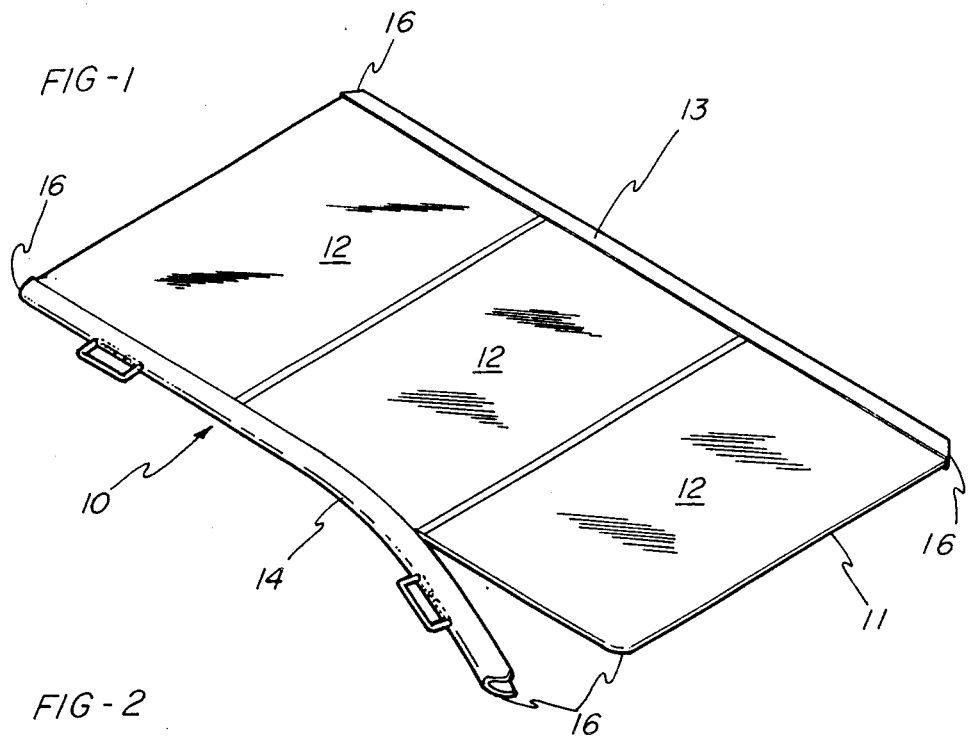
FIG. 1 is a perspective view showing a completed page produced by the apparatus of the invention.

The binding machine shown in the drawings is for use in the manufacture of individual pages for an album such as the page 10 shown in FIG. 1, which comprises a base sheet 11 of paperboard or plastic having a plurality of pockets on one or both surfaces thereof, with each pocket formed by a sheet 12 of clear plastic adhered or otherwise secured along its side and bottom edges to the surface of the sheet 11. Reinforcing tapes 13 and 14 are adhered in overlapping relation with the inner and outer side edges of the sheet 11, and the inner edge tape 14 also carries a pair of wire staples 15, each of which includes a bight portion projecting therefrom for use in binding a plurality of pages 10 in an album. The corners of the page are rounded, as shown at 16.

The apparatus of the invention has the primary purpose of attaching the tapes 13 and 14 to each of a series of successive sheets 11 in a continuous process wherein successive sheets are joined with continuous tapes 13 and 14 to form a web comprising complete pages 10 connected by the tapes, and successive pages are separated from the leading end of the web.

Figure 2:
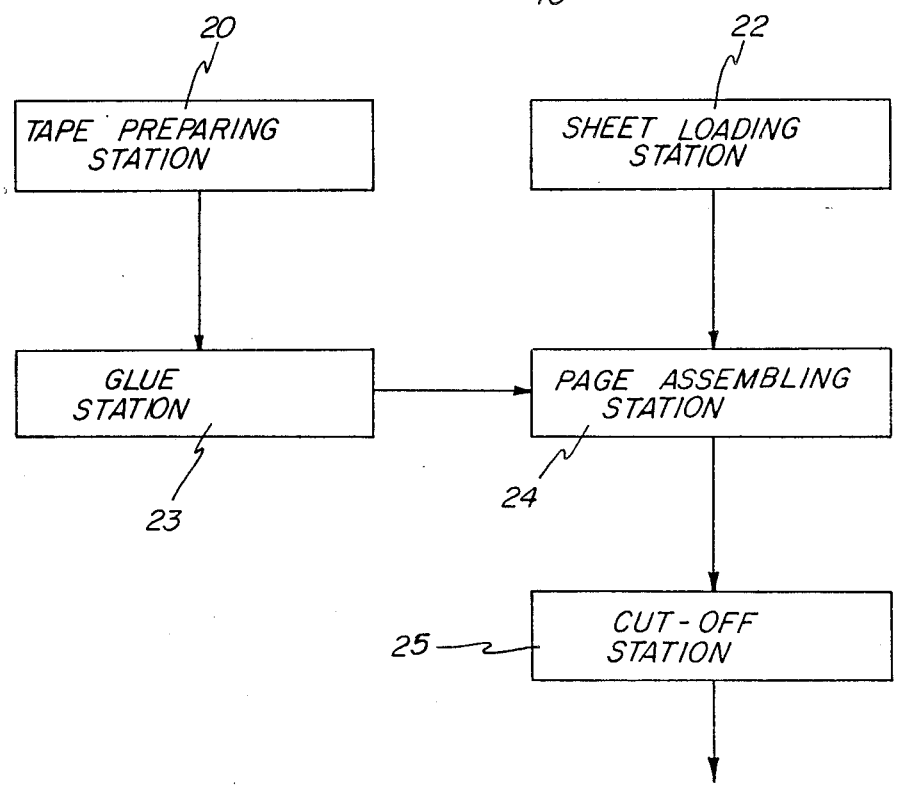
FIG. 2 is a block diagram of the apparatus of the invention by which the method of the invention is performed.

As illustrated in the block diagram in FIG. 2, the apparatus of the invention comprises five primary stations: a tape preparing station 20 wherein two continuous tape strips 13 and 14 are creased, and wherein also staples 15 are applied to one of the tapes, a sheet supply station 22 from which successive sheets 11 are fed to the remaining stations, a glue station 23 where glue is applied to both of the creased tapes, a page assembling station 24 wherein the tapes 13 and 14 are applied and fastened to the side edges of successive sheets 11 to form a web consisting of a series of closely spaced sheets 11 connected by the tapes 13 and 14, and a cut-off station 25 where the tapes connecting the leading pages in the web are severed.

Figure 3:
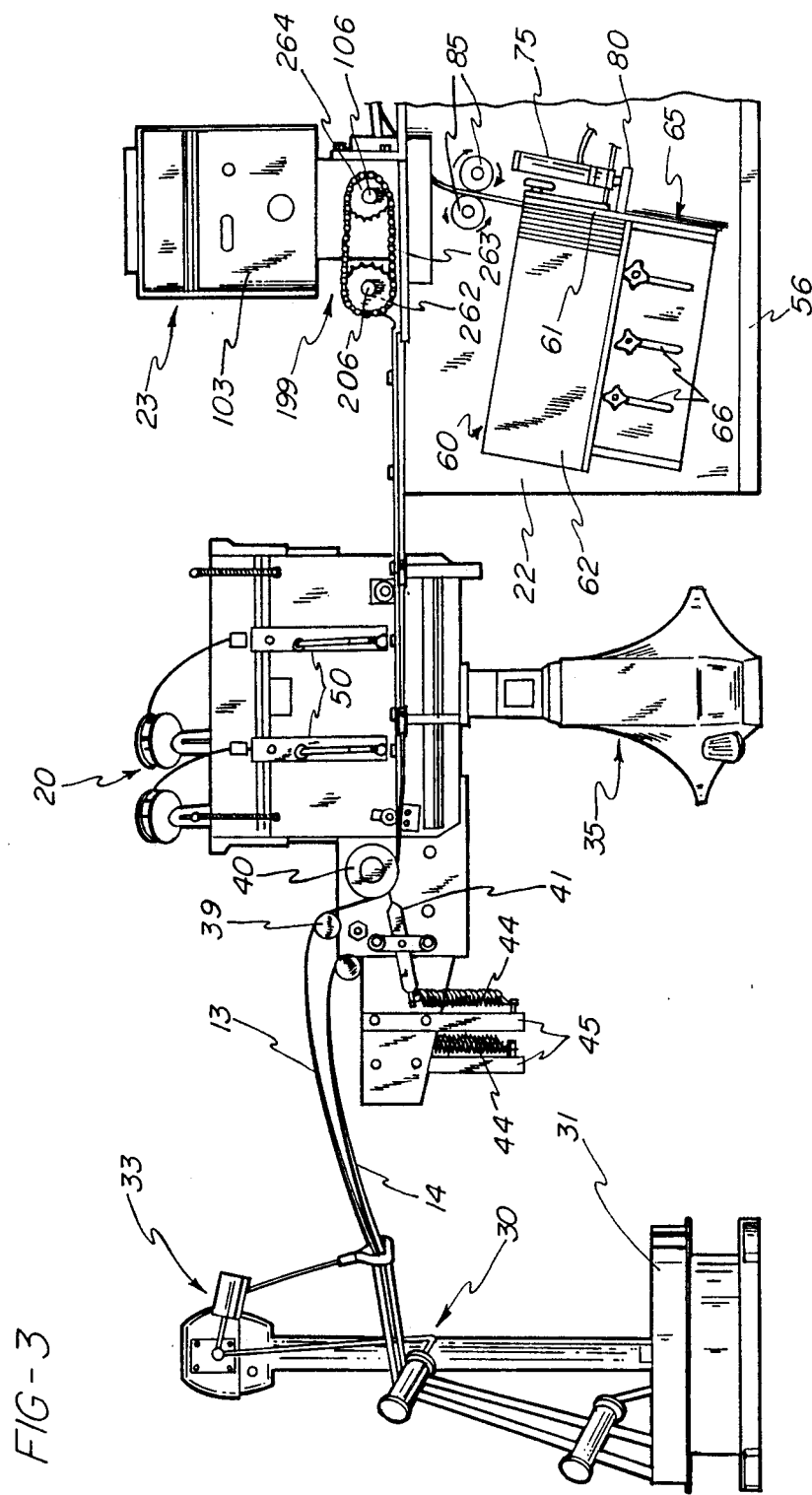
FIG. 3 is a side elevation of approximately the first one-half of the machine of the invention, looking from the front side.
Figure 6:
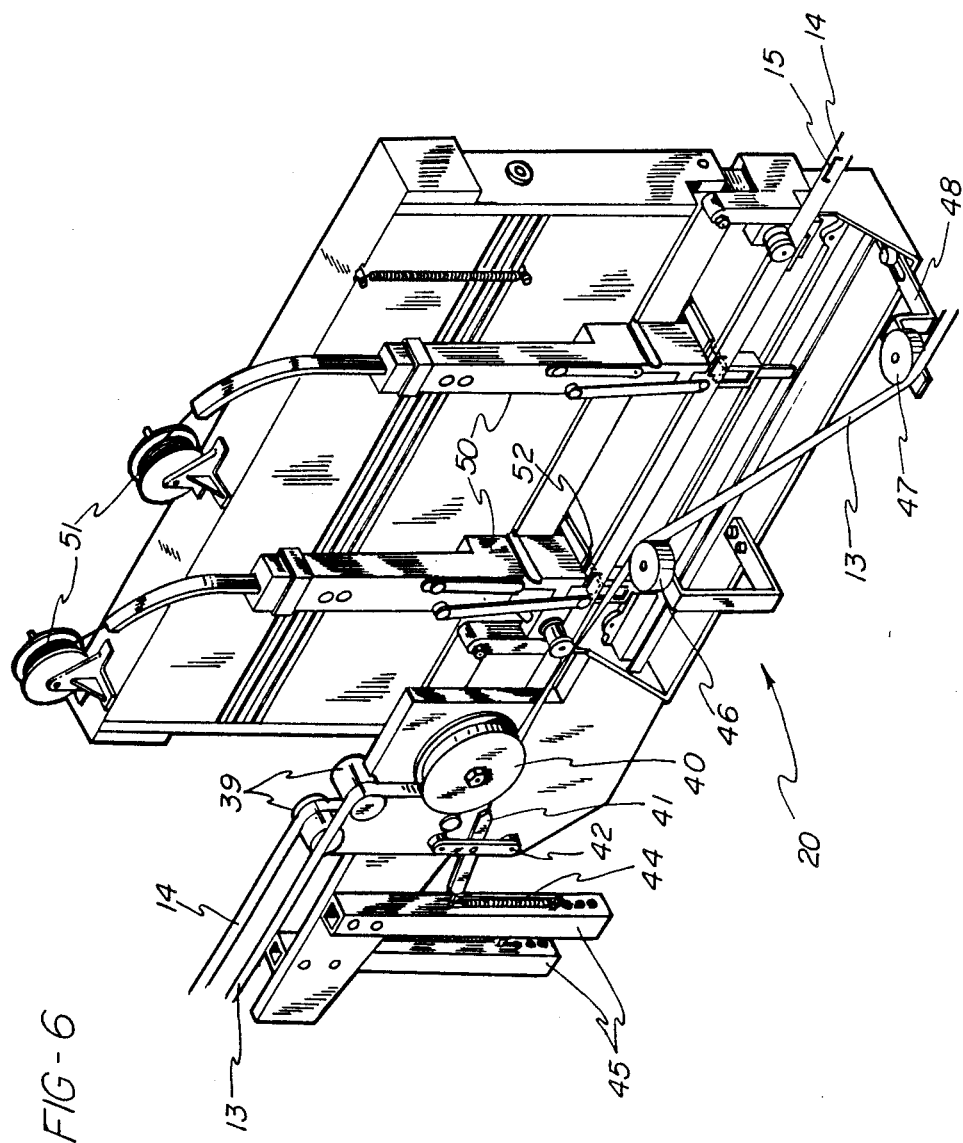
FIG. 6 is a detailed view in perspective showing the tape-preparing section of the machine.

Referring now primarily to FIGS. 3 and 6, two continuous tapes 13 and 14 of paper, plastic or other flexible material are supplied to the tape preparing station 20, by drive means described hereinafter, from a conventional supply source identified generally as 30 which includes a container 31 for rolls of the tape material, and conventional tension control means 33 as shown, for example, in the above Chou et al patent. Very satisfactory results have been obtained utilizing as the tape source 30 a unit which incorporates a powered unwind mechanism, and which is commercially available under the trade name ROTARIAN from Durant Tool Company, Warwick, R.I.

The two tapes 13 and 14 are drawn through the several processing stations by the drive system which is described hereinafter, and which operates to draw the web of sheets and tapes forward periodically through an incremental distance slightly greater than the length of an individual sheet 11, followed each time by a dwell interval during which operations are performed at different stations.

The operating parts at station 20 are mounted on a base 35, and the tape 13 enters this station by wrapping a cylindrical guide member 39 from which it travels downwardly to and around an anvil roll 40. A blade 41 cooperates with the anvil roll 40 to crease the center of tape 13, the blade 41 having a pivotal mounting on a bracket 42 mounted on the base structure. The blade 41 is biased into working engagement with anvil roll 40 by a coil spring 44 which is adjustably attached to a support 45 mounted on a portion of the base structure to vary its biasing force on blade 41.

After being creased, the tape 13 is guided to the proper laterally spaced relation with tape 14 by guide rolls 46 and 47. The supporting bracket 48 for guide roll 47 is adjustably mounted on the base structure in order to set the tape 13 in properly spaced relation with tape 14 for different widths of sheets 11 to be processed in the other stations of the machine.

The tape 14 follows a similar course through a duplicate creasing mechanism, from which the tape continues in a straight line parallel with the laterally displaced tape 13 through a pair of conventional stapling machines 50, such as an ACME Book Stitcher. These machines 50 are motor-operated through a transmission or control which causes them, during each dwell interval of the tape-feeding drive, to apply a pair of staples 15 to each length of tape 14 to be subsequently attached to a sheet 11.

As is well known, each of the stapling machines 50 has a supply roll 51 of wire which it cuts and forms into a staple, and each stapling machine also includes a laterally reciprocating tongue 52 that holds the central part of the staple in spaced relation with the tape 14 in order to form the desired bight portion of the tape staple on the finished page 10 as shown in FIG. 1. Each stapling machine 50 also includes an anvil (not shown) over which the tape 14 travels, and which forms the ends of the two legs of the staple inwardly on the underside of the tape 14.

The remaining stations 22–25 are all mounted on the same main frame, which is of inverted T-shape, comprising a plate 55 which extends vertically upward from a base 56 and carries whatever other frame structure as is needed to carry the working parts of the machine. All of the operating parts of the machine in stations 22–25 and their supporting structure are mounted directly on the plate 55 and/or on one or another of a series of generally triangular brackets 57 which are cantilevered from plate 55.

The main component of the sheet supply station 22 is a hopper 60 which includes a back wall 61 and a side wall 62, and which in operation should at all times contain a quantity of sheets 11 ready to have tapes 13 and 14 applied thereto. The mounting for the hopper 60 includes a compound bracket structure 65 which is mounted for vertical adjustment on the frame plate 55 by means of the knobs and slots identified generally at 66 in FIG. 3.

Figure 7:
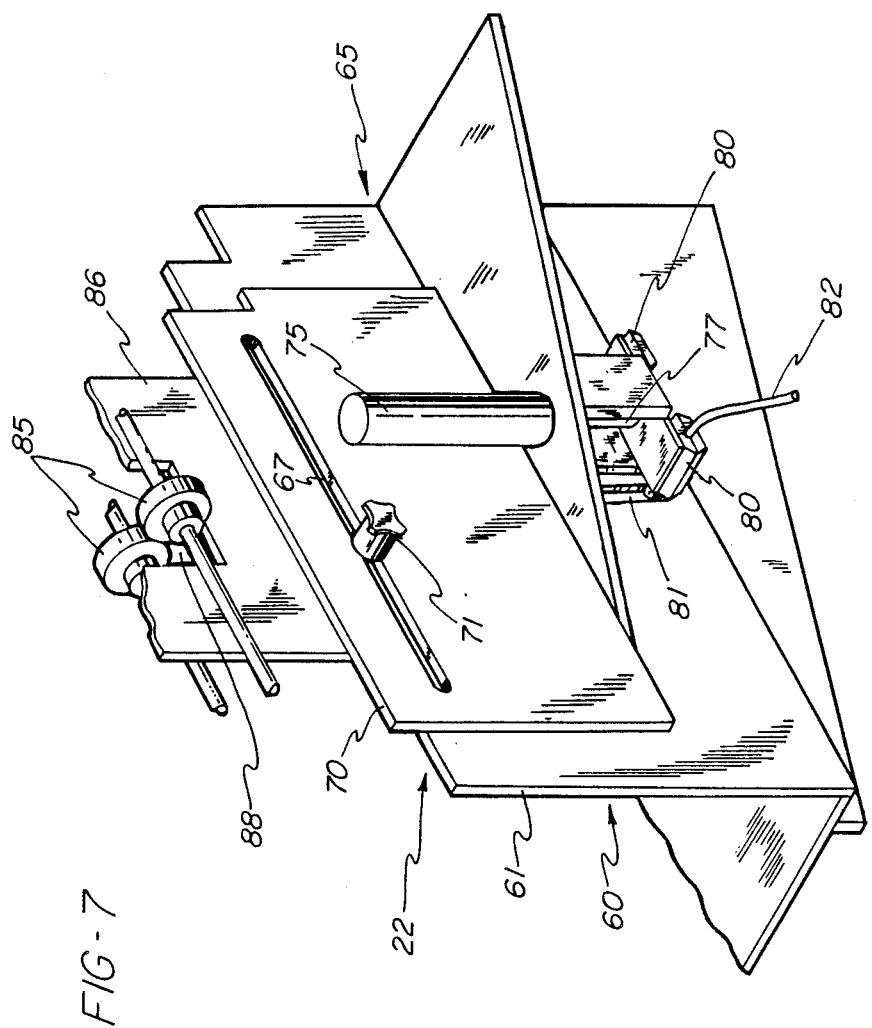
FIG. 7 is a fragmentary perspective view illustrating the sheet-loading station of the machine.

Referring particularly to FIG. 7, the hopper 60 is supported for adjustable lateral movement on the bracket structure 65 by means of one or more clamp bolts (not shown) projecting from the back of wall 61 through a slot 67 in a plate 70 forming a part of the bracket structure 65, each of these bolts having a hand knob 71 threaded thereon by which it can be locked to the bracket plate 70. The supporting structure for the hopper 60 is such that its back wall 61 is tilted forwardly, i.e. in the machine direction, so that when a stack of sheets 11 is set in the hopper, the sheets are supported in similarly forwardly inclined relation by the hopper wall 61.

Provision is made for feeding successive single sheets 11 from a stack supported in hopper 60. As best seen in FIG. 7, an air cylinder 75 is mounted on a shelf 76 forming a part of the bracket structure 65, and the piston rod or ram 77 of this cylinder 75 supports a pair of suction nozzle assemblies 80, each of which extends through a vertical slot 81 in the hopper wall 61. When the cylinder 75 is actuated to retract its piston rod 77, the control system causes suction to be applied to each nozzle 80 by way of the vacuum line 82 so that as the nozzles are raised by the ram 77, they will grip the sheet 11 next to the hopper wall 61 and raise that sheet above the level of the rest of the stack into the nip of a pair of continuously driven feed rollers 85 which are supported above the back wall 61 of the hopper.

Figure 5:
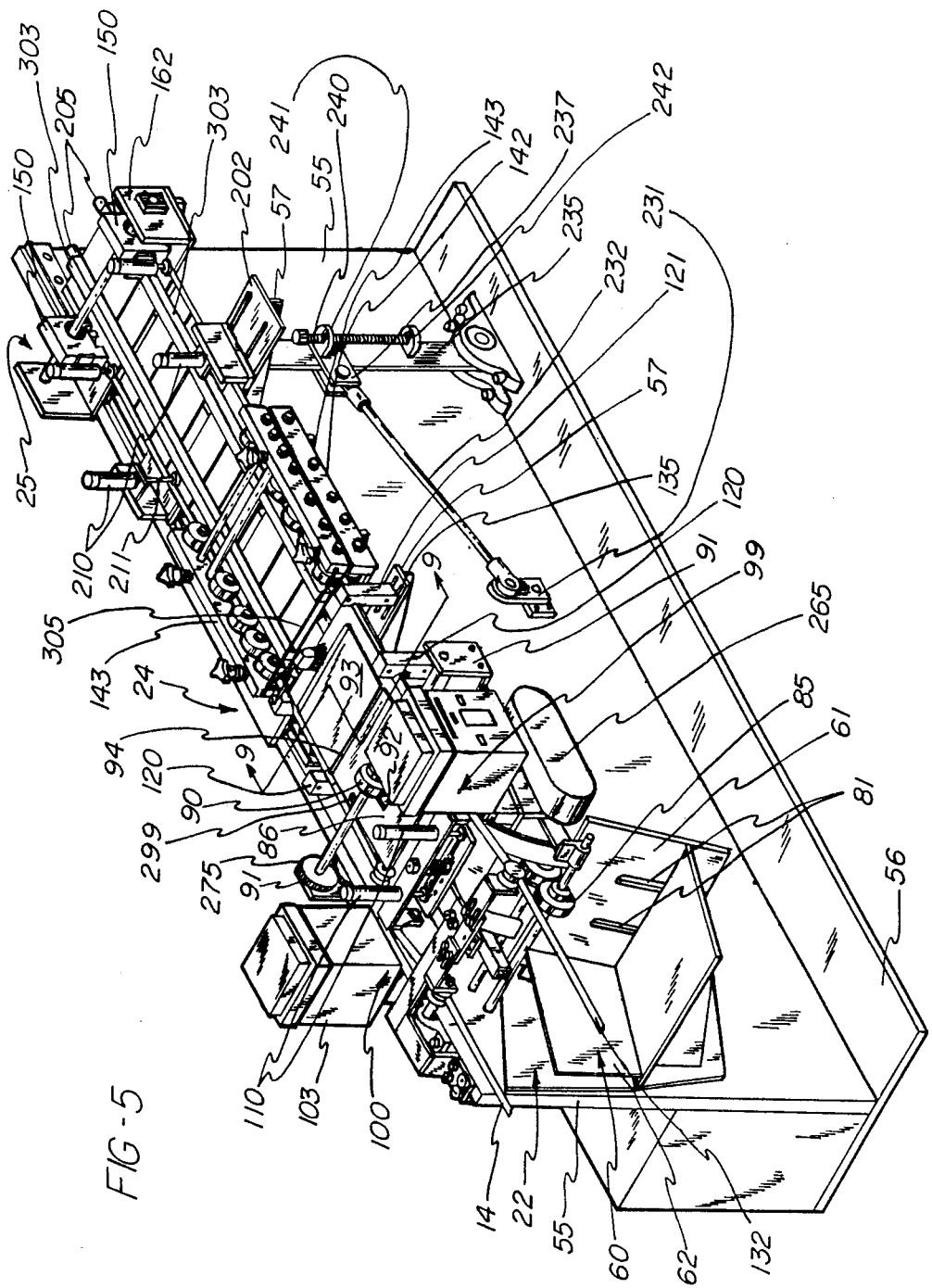
FIG. 5 is a perspective view of the machine of the invention with the first station omitted.

These feed rollers 85 cooperate with a panel 86 which extends upwardly from the top of the hopper wall 61 and is curved forwardly so that its under surface guides the successive sheets 11 into properly aligned relation with the tapes 12 and 13. As shown in FIG. 5, the panel 86 is provided with a cut-out 88 through which the forward one of the feed rollers 85 extends into nip-forming relation with its companion roller.

The panel 86 is of sufficient length to extend forwardly into a substantially horizontal plane to hold the successive sheets 11 down as they travel to the page binding station 24 into the nip of a second pair of continuously driven feed rollers 90, only the upper one of which is shown in FIG. 5, and which are carried on shafts journalled in brackets 91 mounted on opposite sides of the machine frame. This forward portion of the panel includes a second cut-out 92 (FIG. 5) to accommodate the feed rollers 90, and at its downstream end, it is attached to a further panel 93 by a hinged connection 94.

The glue station 23 comprises a pair of glue applicator assemblies, identified generally as 99 and 100 for the respective tapes 13 and 14, which are mounted on the frame plate 55 above the hopper 60. In this station, glue is applied to the undersurface of each of the tapes 13 and 14, and in the preferred practice of the invention, hot glue is used because of the speed with which it sets.

Figure 8:
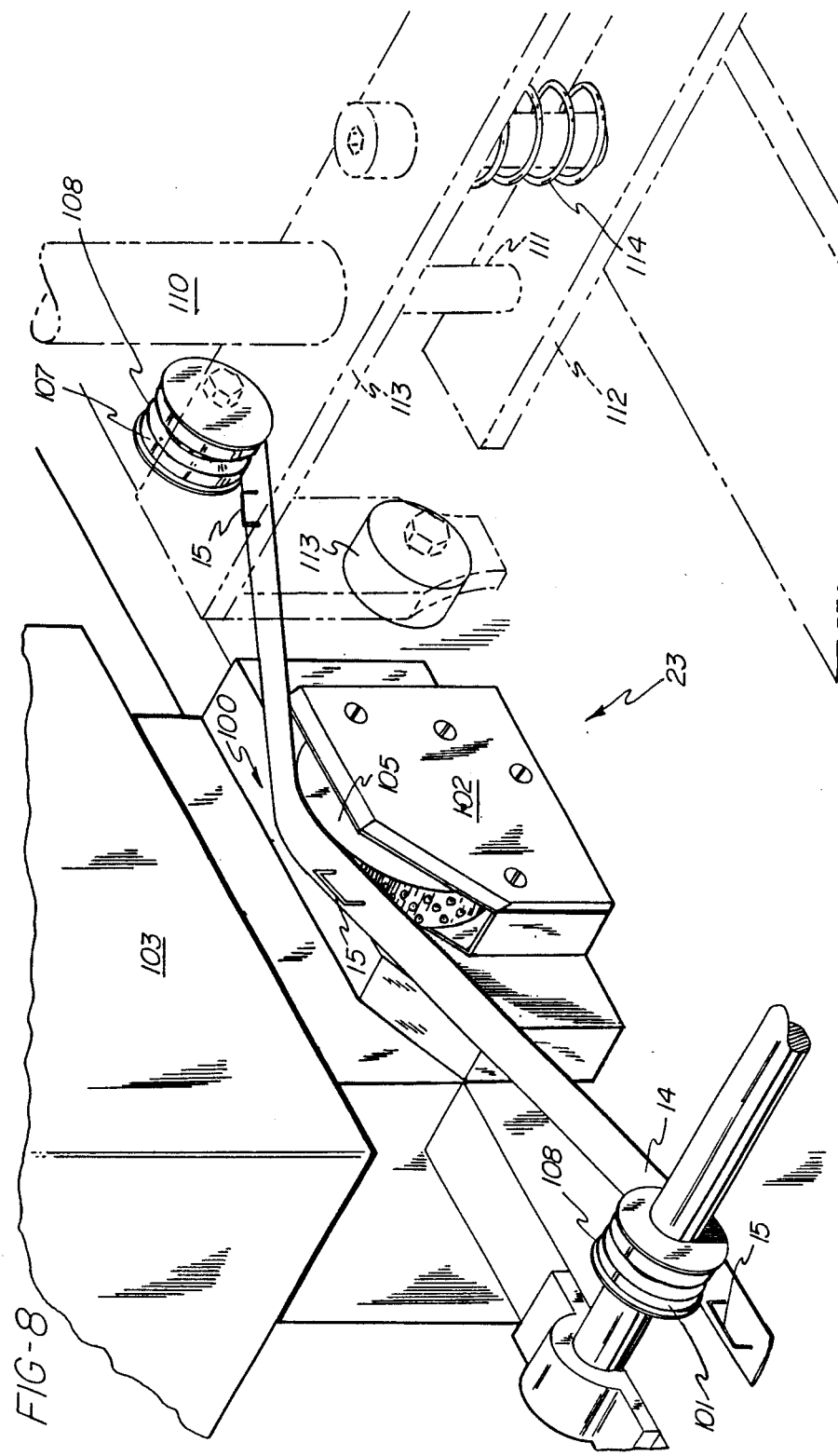
FIG. 8 is a fragmentary perspective view showing one side of the glue station of the machine.

Referring to FIG. 8, which shows the glue applicator assembly 100 for the tape 14, the tape passes under a guide roller 101 to a glue fountain 102 which is continuously supplied with heated glue from a heated reservoir 103. The applicator roll 105 is mounted in fountain 102 on the end of a stub shaft 106 which enters the fountain from the back side of the machine, and roll 105 is shown as having a patterned surface for applying the glue in a corresponding pattern to the tape 14.

In operation, the applicator roll 105 is driven periodically, whenever the tape is being advanced, as described hereinafter. The tape 14 travels from under the guide roller 101 over the applicator roll 105, and then under a guide roller 107 after glue has been applied to its undersurface. Each of the guide rollers 101 and 107 has a centrally located circumferential slot 108 to receive the bight portion of each staple 15 passing under these rolls.

Provision is made for separating the tape 14 from the applicator roll 105 when the machine is not in operation. Two air cylinders 110 have their rams 111 secured to a part 112 of the base structure, and the cylinders 110 are in turn connected to a hanger 113 which serves as the support for the guide roller 107 above the tape 14 and also for a roller 113 below the tape, as well as for two similar guide rollers above and below the tape 13.

The control system is such that so long as the machine is in operation, the cylinders 110 remain in their lower limit positions wherein they hold the parts carried thereby in the positions shown in FIG. 8. When the air supply to cylinders 110 is discontinued, as whenever the machine is shut down, a compression spring 114 between the base part 112 and hanger 113 raises both of rollers 107 and 113 and thereby lifts tape 14 out of engagement with the applicator roll 103.

The glue applicator assembly 99 for tape 13 is mounted on the other side of the machine, and it includes a periodically driven applicator roll like the roll 105 and similarly mounted on a stub shaft 106, as well as rollers (not shown) for the same purpose as rollers 107 and 114 which are mounted on the opposite side of the hanger 113 for up and down movement with the rollers 107 and 114. To adapt the machine to the handling of sheets 11 of different widths, the glue applicator assembly 99 is mounted for lateral adjustment on the base frame, by any convenient arrangement of slots and clamp bolts, to align its component rollers with any adjusted position of the path of tape 13.

Figure 9:
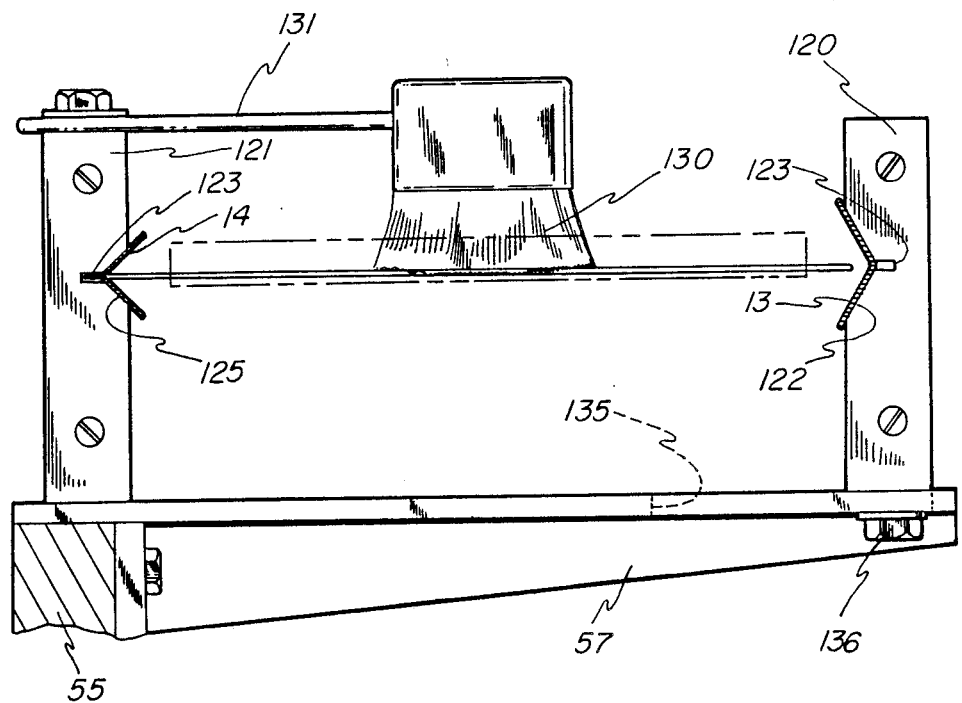
FIG. 9 is a fragmentary section on the line 9—9 of FIG. 5.

After the tapes 13 and 14 leave their respective glue stations, each is progressively folded along its crease line so that its sides form approximately a right angle when the tapes are first brought into engagement with each successive sheet 11. For this purpose, as best seen in FIG. 9, each tape is guided into successive contact with two vertical bars 120 and 121 of rectangular section which are mounted in spaced relation with each other on parts of the main frame downstream from the glue station 23. As shown in FIG. 9, the inner edge of each bar 120 is provided with a notch 122 having a slot 123 at its apex. The notches 122 in bars 120 have their opposed sides defining an angle of 120°, and there is a similar notch 125 in each bar 121 which has its sides defining an angle of 90°.

These notches thus combine to fold each tape progressively to a right angled relation of its two halves, while the staples 15 carried by the tape 14 pass through the slots 123. Also, the bars 121 are set closer to each other than the bars 120 to cause the partially folded tapes to converge into engagement with the leading corners of successive sheets 11 as they are fed forward. One of the bars 121 also supports a brush 130, which is suspended from an arm 131 mounted on this bar 121 so that it applies gentle retarding and holding pressure on each sheet 11 before it enters the page assembling section 24, as now described.

In operation, the opposed notches 125 in the bars 121 establish the width of each successive page 10 and maintain that width constant even if the individual sheets 11 may vary from a pre-established maximum. More specifically, the bar 121 at the front of the machine is adjustable laterally of the machine, as indicated by the slots 135 and clamp bolts 136 (FIGS. 5 and 9), the adjusted position of this bar establishes the relative spacing of the tapes 13 and 14 on each page 10 for a corresponding maximum width of sheet 11, and if any sheet 11 is of a lesser width, the tapes compensate therefor so that all finished sheets 10 will be of the same width.

Figure 4:
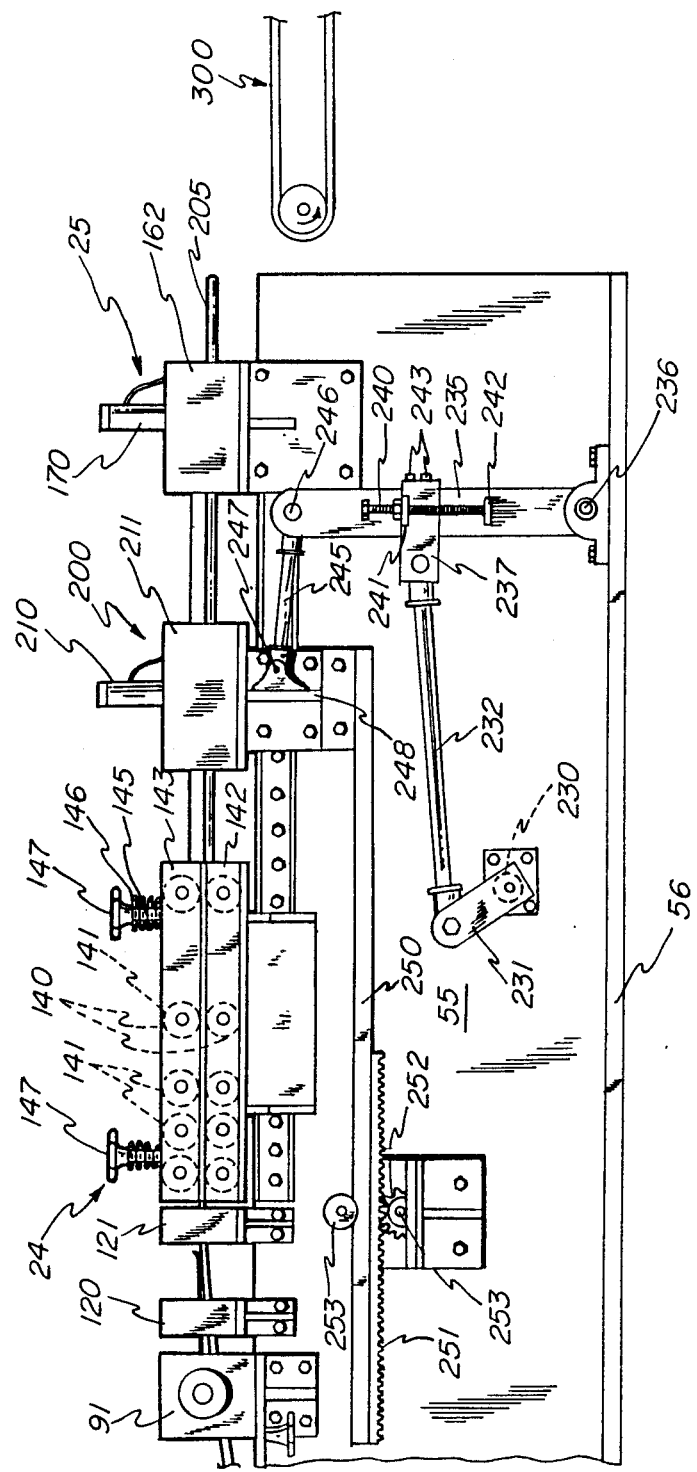
FIG. 4 is a view like FIG. 3 of the remainder of the machine.

The primary operating members in page assembling section 24 are sets of multiple pairs of pressure rollers 140 and 141 which are arranged on opposite sides of the machine to complete the folding of the tapes 13 and 14 into enclosing and bonded relation with the side edges of the successive sheets 11. As best seen in FIGS. 4 and 5, two blocks 142 are mounted on opposite sides of the machine frame just downstream from the bars 121, and each of these blocks 142 has rotatably mounted on its inner side a plurality of lower pressure rollers 140, five being shown. A similar block 143 is mounted above each block 142 and carries the mating rollers 141 for the rollers 140.

In order to adjust the pressure between the rollers in each of these pairs, the mounting between each pair of blocks 142 and 143 comprises two studs 145 set in the lower block 142 and extending freely through its upper complementary block 143. On the threaded upper end portion of each of these studs, there is mounted a coil spring 146 and a threaded knob 147. When the knobs 147 are tightened on the studs 145, the resulting compression of the springs 146 will correspondingly adjust the pressure between each of the mating rollers 140 and 141 which compress the tapes 13 and 14 as they pass between the sets of rollers during operation of the machine as described hereinafter.

Figure 11:
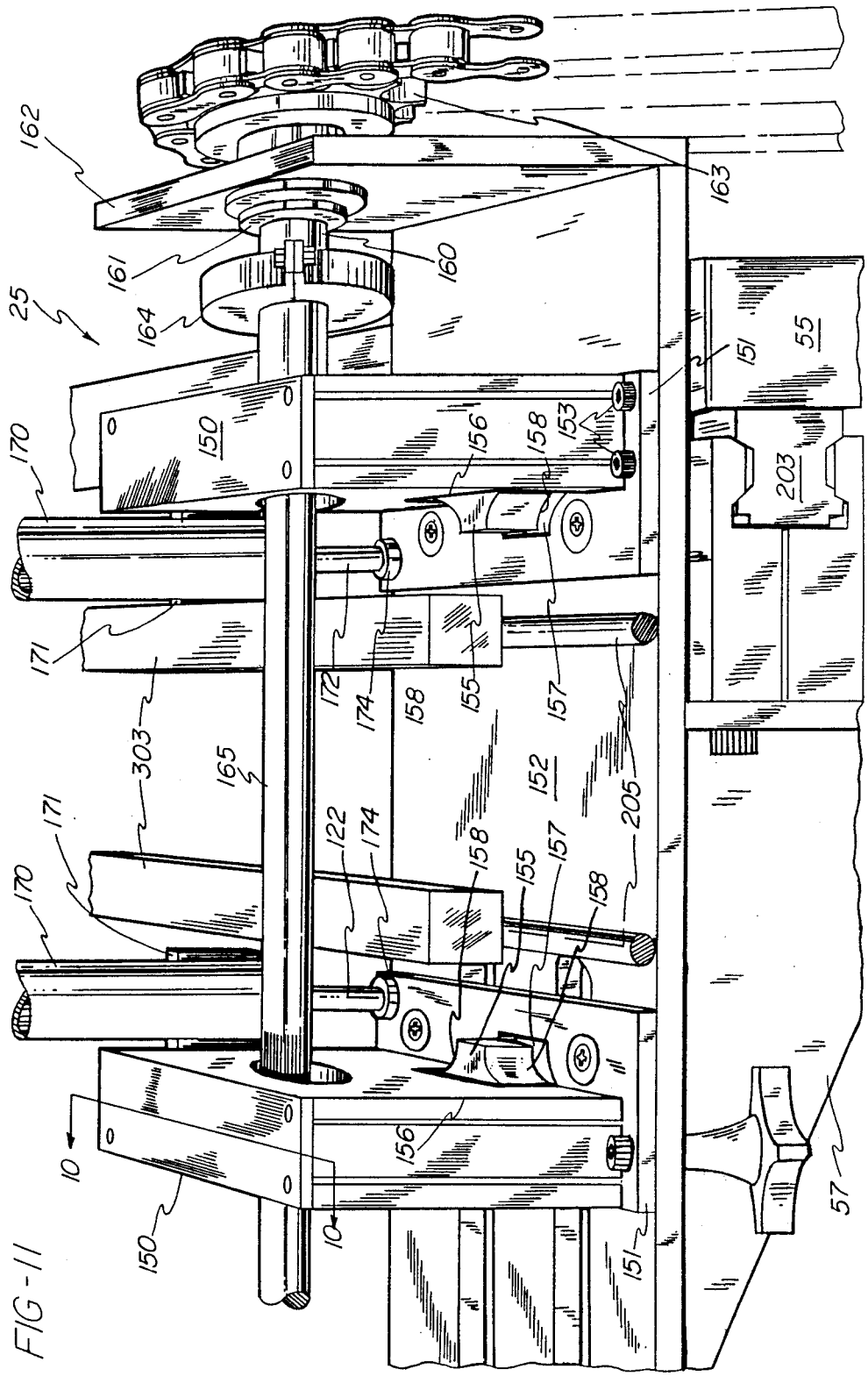
FIG. 11 is a perspective view of the discharge end of the cut-off station of the machine.

Referring now to FIG. 11, the cut-off station 25 is located at the discharge end of the machine, and comprises a pair of box-like housings 150 mounted on opposite sides of the machine. Each housing 150 includes a base plate 151 by which it is mounted on a plate 152 forming a part of the machine frame. The housing 150 at the back side of the machine is fixed to the plate 152 by clamp bolts 153, while the housing 150 at the front side of the machine is adjustable laterally of the machine by movement of its clamp bolts 153 in slots 154 in plate 152.

Each cutter mechanism includes a cutting punch 155 mounted for vertical reciprocating movement inside the housing 150 and projecting therefrom through a slot 156 in the inner side wall of the housing in overlapping relation with the path of the adjacent tape 13 or 14 to the discharge end of the machine. In operation as described hereinafter, successive sheets 11 are bound with the tapes 13 and 14 in spaced relation such that adjacent sheets are connected by short lengths of tape. Each punch 155 is therefore configured to remove the connecting piece of tape between adjacent sheets on its side of the machine, and the mounting plate 151 for each of these cutter assembly has a complementary hole 157 therethrough which receives the associated punch 155 at the end of its cutting stroke, along with the piece of tape cut out thereby.

As best seen in FIG. 11, each punch 155 has a pair of oppositely curved faces 158, and it is the similarly curved bottom edges of these curved faces which do the actual cutting of the tapes. Thus not only does each panel remove the pieces of tape connecting adjacent pages in the web, but the curved edges 158 simultaneously provide the adjacent corners of these pages with rounded edges, as illustrated at 16 in FIG. 1.

Figure 10:
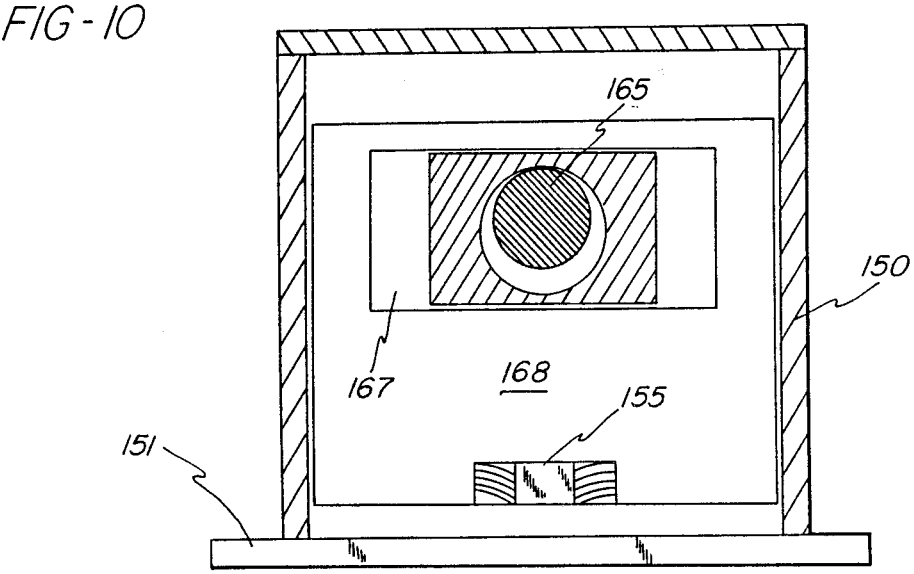
FIG. 10 is an enlarged fragmentary section on the line 10—10 of FIG. 1.

The drive for the cutter assemblies, as shown in FIGS. 10 and 11, comprises a short drive shaft 160 supported by a bearing 161 in a plate 162 forming an upward extension of the plate 152 at the back side of the machine. The outer end of shaft 160 carries a sprocket 163 driven through the drive system of the machine described hereinafter. The inner end of shaft 160 carries a disk 164 to which is eccentrically attached a crankshaft 165 that extends through both of the housings 150 and has its other end supported in a plate 162 at the front of the machine.

In each housing 150, the crankshaft 165 extends eccentrically through a cylindrical bore of larger diameter through a rectangular block 166 which is movable laterally in a horizontal rectangular slot 167 in a block 168 that is vertically movable in the housing 150 and carries the associated punch 155. Rotational movement of crankshaft 165 will therefore cause lateral movement of block 166 and vertical movement of block 168. Thus for each complete revolution of shaft 160, the crankshaft 165 will cause the cutter punches 155 to execute a cycle of a downward cutting stroke and an upward return stroke.

Each of the housings 150 has an air cylinder 170 mounted thereon upstream from the cutter punches 155, by any convenient means such as a bracket 171 projecting from the inner wall of the housing. The ram 172 of each cylinder 170 depends therefrom and carries a pad 174 on its lower end for releasable clamping engagement with the upper surface of the housing mounting plate 151. The purpose of these cylinders 170 is to clamp the web of sheets 11 and tapes 13-14 to the base structure during the cutting stroke of punches 155 as further described hereinafter.

Figure 12:
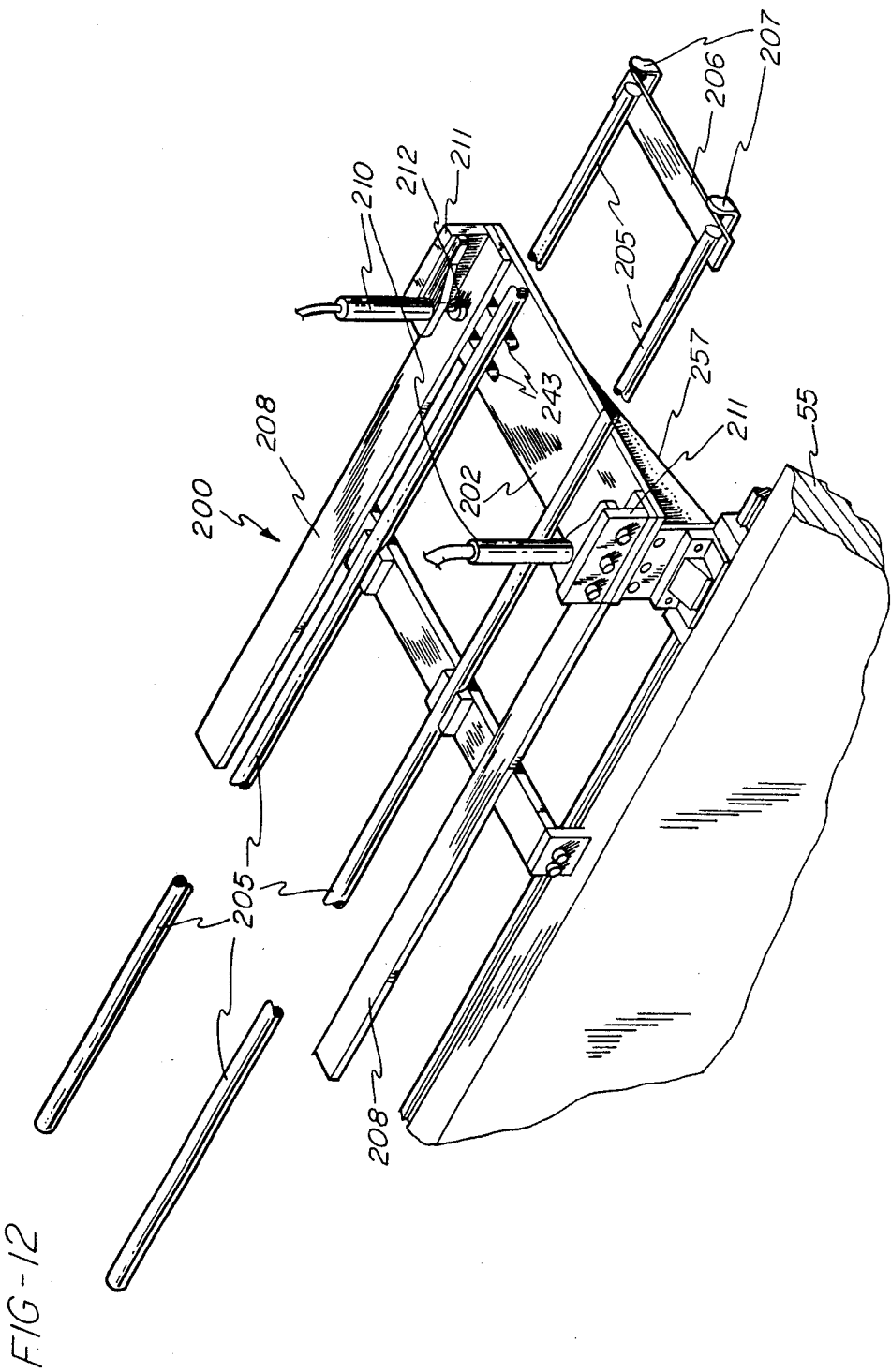
FIG. 12 is a perspective view of the carriage member of the machine viewed separately from the machine.

The primary member of the drive system which advances the tapes 13-14 and successive sheets 11 through the page-binding and cut-off sections of the apparatus is a carriage 200, shown individually in FIG. 12, which is caused to reciprocate on the main frame in timed relation with other parts of the machine.

During each forward stroke of carriage 200, it carries with it the web of sheets 11 and tapes 13-14 until the trailing edge of the leading assembled page 10 has passed just beyond the cutter punches 155 to the position wherein the pieces of tapes 13 and 14 which connect the leading pair of assembled pages are in line with the punches 155. At the same time, the carriage 200 causes a sheet 11 to be assembled with the tapes 13-14 at the trailing end of the web, as described hereinafter. Then while the carriage is on its return stroke, which constitutes the dwell interval for the pages already assembled with the tapes, the tape portions connecting the leading pair of assembled pages are cut out, and during the same interval, staples are applied to the appropriate length of tape 14 dwelling in the station 20.

Referring to FIG. 12, the carriage 200 comprises a plate 202 which extends across the width of the machine and is supported for linear movement on a rail 203 mounted on the frame plate 55, the supporting structure for the plate 202 being cantilevered from rail 203. On top of plate 202 are mounted two cylindrical rods 205 which are of sufficient length to extend substantially the full length of the machine as described hereinafter.

These rods 205 support the web of assembled sheets 11 and tape 13-14 in their travel from assembling station 24 to cut-off station 25. At their upstream ends, the rods 205 are connected by a bar 206 which includes a pair of upwardly projecting hooks 207 that have an important function in the operation of the machine as described hereinafter. The carriage 200 also includes a pair of laterally spaced lightweight bars 208 mounted on plate 202 to serve as guides for the web of pages and tapes passing therebetween. The rim 209 projecting from the bar 208 at the back of the machine can be used to operate microswitches at each end of the operating stroke of the carriage.

The carriage 200 also has mounted thereon a pair of air cylinders 210 for clamping the web of assembled sheets and tapes to the carriage during the feeding stroke of the carriage. More specifically, at the back side of the machine, a bracket 211 is secured on the end of plate 202 at the back of the machine and serves as a mount for one air cylinder 210, which has its ram 212 depending therefrom for clamping engagement with the upper surface of plate 202. A similar bracket 211 for supporting the other air cylinder 210 is mounted on the end of plate 202 which projects beyond the front side of the machine frame, and this bracket 212 is mounted by clamp bolts in slots 213 for adjustment on plate 202 crosswise of the machine in accordance with the width of sheets 11 to be handled.

Figure 13:
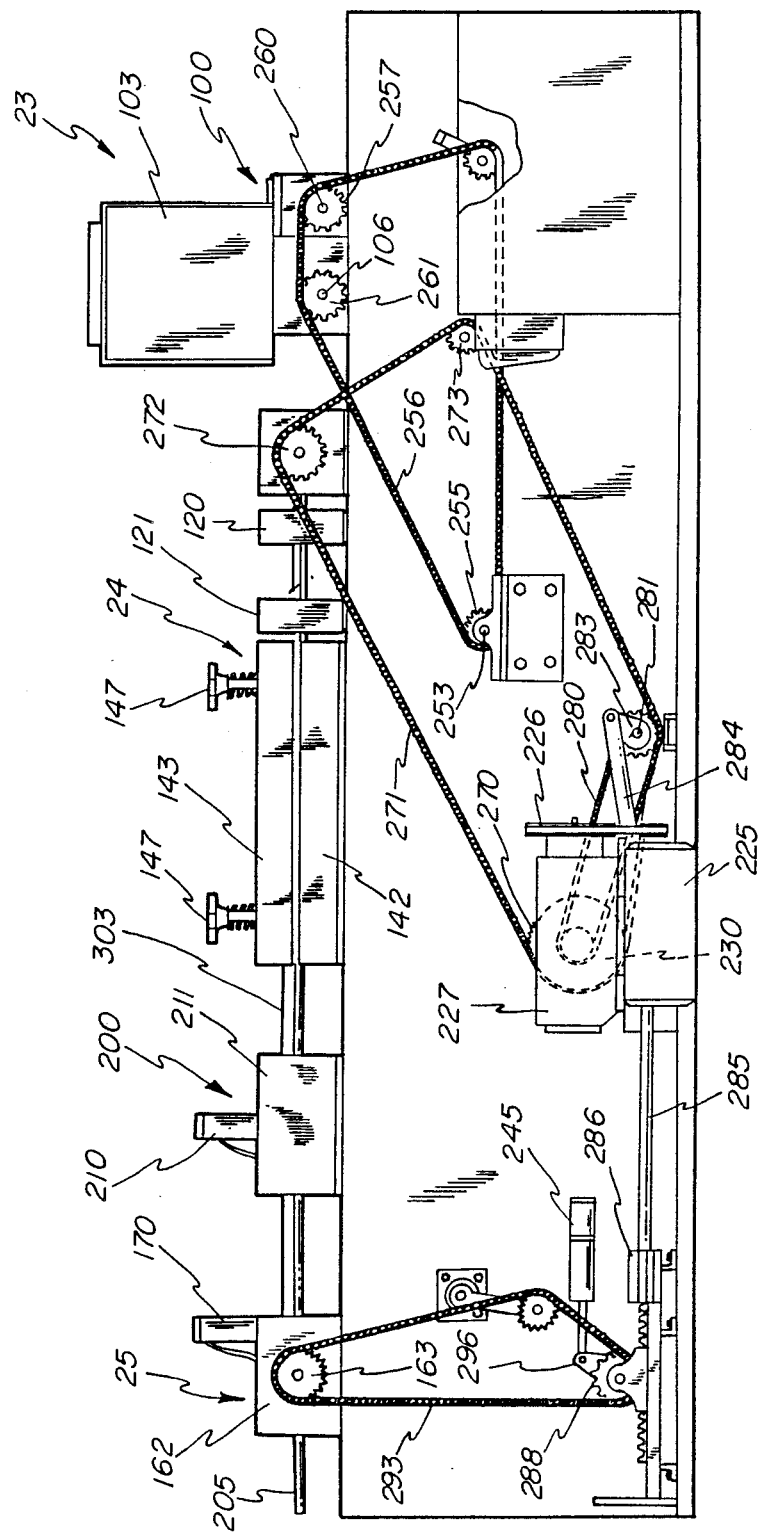
FIG. 13 is a somewhat diagrammatic view of the back side of the machine to illustrate the drive system.

The drive system for the machine is best seen in FIGS. 4, 5 and 13. It includes a single drive motor 225 at the back side of the machine that provides the power for all moving parts except the staplers 50, which have their own drive motor. The motor 225 is connected through a belt drive 226 and a right angle gear reducer 227 to a main drive shaft 230, which extends to the front of the machine where a crank arm 231 is fixed thereon. A connecting rod 232 is pivotally attached at one end to the crank arm 231, and the other end of rod 232 is pivotally connected with a rocker arm 235 having its lower end pivotally mounted at 236 on the base 56.

The movements of connecting rod 232 in response to rotation of shaft 230 will cause the rocker arm 235 to oscillate about its pivotal mounting 236, and the connection between the rod 232 and rocker arm 235 is adjustable lengthwise of arm 235 to vary the arc through which arm 235 oscillates. This connection includes a clevis 237 to which the rod 232 is pivotally connected, and which is itself mounted for adjustment lengthwise of arm 235.

For this purpose, a threaded rod 240 is threaded through a tapped boss 241 on clevis 237 and has its lower end rotatably held in a bracket 242 fixed on arm 235. Thus rotation of rod 240 in bracket 241 will cause the clevis 237 to move up or down on arm 235 to vary the angle through which this arm rocks as the connecting rod 232 is moved back and forth by crank arm 231. Clamp bolts 243 on the closed side of clevis 237 are used to clamp the clevis to arm 235 in each desired adjusted position.

A second connecting rod 245 has one end pivotally connected at 246 to the upper end of rocker arm 235. The other end of rod 245 has a pivotal connection 247 to a bracket 248 which is a reinforcing part of the carriage 200. This linkage therefore converts the oscillating movement of the rocker arm 235 into linear reciprocating movement of the carriage 200. The length of each stroke of carriage 200 can be varied by adjustment of the clevis 237 as already described, and also by the use of a connecting rod 245 which is adjustable in length, as by incorporating a turnbuckle in the rod 245.

The reciprocating movement of the carriage 200 is employed to transmit a periodic rotary drive to the two stub shafts 106 which carry the glue applicator rolls 105. As best seen in FIG. 4, a bar 250 has a cantilevered mounting on carriage 200 at the front of the machine, and the other end of this bar has a set rack teeth 251 on its under side. These teeth are held in mesh with a pinion 252 on one end of a shaft 253 by an idler roller 254 mounted on the machine frame. The shaft 253 extends to the back side of the machine and has a driving sprocket 255 mounted on its other end. The pinion 252 is mounted on shaft 253 by a one-way clutch (not shown) such that it drives shaft 254 only during the feeding stroke of the carriage 200 toward the cut-off station 25.

At the back side of the machine, the periodic rotational movement of sprocket 255 is transmitted by a chain 256 to a sprocket 257 on a cross shaft 260 and also a sprocket 261 on the stub shaft 106 carrying the glue applicator roll 105 for the tape 14. At the front of the machine, the cross shaft 260 carries a sprocket 262 (FIG. 3) and chain 263 for driving a sprocket 264 on the stub shaft 106 which carries the glue applicator roll for the tape 13, and this chain transmission is shown in FIG. 5 as provided with a protective housing 265.

This arrangement of separate drives for the two glue applicator rolls facilitates adjustment of the glue applying assembly 99 laterally of the machine, as by providing the sprocket 262 with a releasable attachment to shaft 260, e.g. a set screw. It is then necessary merely to release, slide and reset the sprocket 262 along cross shaft 260 as required for each adjusted position of assembly 99 and its stub shaft 106.

There is also a continuous drive from the main shaft 230 to each of the pairs of feed rollers 85 and 90 by which successive sheets 11 are fed from hopper 60. This drive includes a sprocket 270 on main shaft 230 at the back side of the machine from which a chain 271 drives a sprocket 272 on the shaft carrying one of feed rollers 90, and also a sprocket 273 on the shaft driving one of the feed rollers 85. The twin shafts carrying each set of feed rollers 85 and 90 may be geared together, as indicated at 275 in FIG. 5 for rollers 90, or the directly driven feed roller may drive its mate by friction, as in the case of rollers 85.

A periodic drive is provided from the main drive shaft 230 to the cut-off station 25, as shown in FIGS. 13 and 14. This drive includes a sprocket (not shown) on shaft 230 from which a chain 280 drives a stub shaft 281 in bearings (not shown) mounted on base plate 56. A crank 283 on shaft 281 is connected by a connecting rod 284 with a bar 285 supported for reciprocating movement in a linear bearing 286 which is set on the base 56.

Rack teeth 287 on the upper side of the end portion of bar 285 mesh with a pinion 288 which is mounted on and connected through a one-way clutch (not shown) with a shaft 290 mounted in bearings 291 fixed to the base 56. A sprocket 292 fixed on shaft 290 is connected through a chain 293 to the sprocket 163 on the cutter drive shaft 160. Thus every other stroke of the rack bar 285, which coincides with the return stroke of carriage 202, will be transmitted to the cutter shaft 160 to cause the cutters 155 to cycle through their respective cutting strokes.

It has been found in test operation that the timing of the cutting operation tends to be affected by accumulating error in its drive system, and for this reason, provision is made for positively moving the cutters to their uppermost position at the end of each cutting stroke. This is done by means of an air cylinder 295 which is caused to drive the shaft 290 through a crank 296 and one-way clutch under the control of a proximity switch (not shown). This switch senses the position of a bolt set in the shaft 290, and if the shaft has not completed one revolution for each driving stroke of rack bar 285, the switch activates the cylinder 295 to advance shaft 290 accordingly by driving the crank 296 into contact with an appropriately adjustable stop bolt 297.

Operation

When the machine is in regular operation, the feed rollers 85 and 90 operate continuously, but they are supplied with sheets 11 periodically, while other active parts of the machine operate periodically in properly timed relation with each other.

As a convenient starting point for the description of the operation of the machine, it will be assumed that the carriage 200 in in the course of a feeding stroke toward the cut-off station 25. During each such stroke, the air cylinders 210 on the carriage are in their operated positions wherein they clamp to the carriage the web of several sheets 11 connected by the tapes 13 and 14, thereby causing the entire web to be drawn downstream along with the tapes 13 and 14 which trail this web. The length of each stroke of the carriage is adjusted, as previously described, so that it is equal in length to the length of each successive sheet 11 plus a predetermined distance which provides a desired space between adjacent sheets in the web, e.g. 0.375 inch, that matches the corresponding dimension of each cutter punch 155.

The purpose of this adjustment is to assure that when the carriage reaches the downstream end of its feeding stroke, the assembled page 10 at the leading end of the web will be in a position wherein the pieces of tape 13 and 14 connecting it with the next following page are accurately aligned with the cutter punches 155. Also, this adjustment assures that the proper lengths of tapes 13 and 14 will be advanced into station 20 so that staples 15 can be attached to tape 14 during the dwell interval for the tapes.

As soon as the carriage 200 begins a feeding stroke, other parts of the machine operate to deliver a new sheet 11 into proper position to be picked up by the carriage when it starts its next feeding stroke. More specifically, a photocell sensor (not shown) is set on the frame in position to be activated by the absence of a sheet 11 in the space between the feed rollers 90 and the first pair of tape folding members 120, the viewing path for this sensor being through an opening 299 in the forward portion of panel 86.

The control circuitry actuated by this photocell is such that when there is no sheet in that space, the air cylinder 75 is operated to raise the suction nozzle assemblies 80 and thus to cause a single sheet 11 to be lifted from hopper 60 into the feed rollers 85. This sheet 11 is therefore advanced by feed rollers 85, and then by feed rollers 90, which drive it out from under the hinged panel 92, to a position wherein its leading edge lies between the tape-folding bars 120 and 121, and its trailing edge is slightly forward of the rearmost portions of the hooks 207 on the upstream ends of the carriage rods 205. The brush 130 holds each successive sheet in this position, as it waits for the next feeding stroke of the carriage.

As previously pointed out, this initial feeding of the next sheet 11 begins while the carriage is still on its forward feeding stroke. When it reaches the end of that stroke the arm 209 thereon actuates a microswitch (not shown) controlling the pressure air supply to the cylinders 170 at the cutting station and also the cylinders 210 which have been clamping the web of sheets and tapes to the carriage. Operation of this switch causes the cylinders 210 to retract from their clamping positions, and simultaneously causes the cylinders 170 to clamp the next to leading page 10 to the cutter housing supporting plates 171.

As soon as the cylinders 210 on the carriage 200 have been released, the carriage begins its return stroke, and during this dwell period for the tapes 13–14, the stapling machines 50 are actuated to set a pair of staples 15 in the length of tape 14 then standing in station 20. Also during this dwell period, the rack bar 285 moves through the part of its reciprocating cycle during which it causes the cutter shaft 160 to be driven through its cycle wherein the cutter punches 155 remove the pieces of tape connecting the leading pair of pages 10 and thereby release the resulting separate page.

This leading page is still being supported by the downstream end portions of carriage rods 205, but this support is withdrawn as the carriage moves away in the upstream direction. The separated page is therefore then free for delivery by gravity or otherwise to whatever means may be provided for collecting the separate pages 10, which may, for example, be a take-away belt conveyor as indicated fragmentarily at 300 in FIG. 4.

As the carriage 200 completes its return stroke, its arm 209 actuates a second microswitch (not shown) which causes the control system to reverse the air cylinders 170 at the cut-off station and the air cylinders 210 on the carriage 200, causing the cylinders 210 again to clamp the tapes 13—14 and the portions of sheet 11 therebetween to the carriage. Then as the carriage starts its next feeding stroke, the hooks 207 on the upstream end of the rods 205 engage the trailing edge of the sheet 11 which was waiting to be picked up, and draw that sheet forward until its leading corners engage the converging tapes 13 and 14 as the tapes reach the downstream pair of tape-folding bars 121. As the carriage continues forward, it draws the web of assembled tapes and sheets again toward the cut-off station.

During the first portion of that feeding stroke, the lengths of tapes 13 and 14 bordering the newly added sheet 11 will be folded into bonded relation with the side edges of that sheet as they pass together between the sets of compression rollers 140–141. Also, throughout each feeding stroke of the carriage 200, the sheets 11 in the web moving therewith are held down on the carriage by a pair of lightweight bars 303, of low friction material such as nylon, having their upstream ends pivotally mounted on a rod 305 supported at its opposite ends in the roller-carrying blocks 143. At their downstream ends, the bars 303 lie on and hold the advancing sheets 11 down on the carriage rolls 205 as the leading sheet slides under the ends of these rods.

It will accordingly be seen that the operation of the machine is precise and wholly automatic, requiring only that there always be supplies of tape in the container 31, wire spools for each stapler 50, glue in the reservoirs 103, and sheets 11 in the hopper 60. Also, the machine is readily adjustable to handling sheets of different widths, by lateral adjustment of parts along the front side of the machine already described, and also sheets of different lengths, by adjustment of the length of the stroke of the carriage 200 as also already described. The machine of the invention accordingly successfully eliminates all of the problems indigenous to the current relevant technology, and particularly the need for constant skilled hand labor, as well as greatly increasing the output rate of finished pages.

While the method herein described, and the form of apparatus for carrying this method into effect, constitutes a preferred embodiment of this invention, it is to be understood that the invention is not limited to this precise method and form of apparatus, and that changes may be made in either without departing from the scope of the invention which is defined in the appended claims.

What is claimed is:

1. Apparatus for manufacturing, on an automatic continuous basis, successive album pages of predetermined length and width each of which comprises a base sheet having a reinforcing tape bound thereto in overlapping relation with each side edge thereof, comprising:
 (a) means defining a page assembling station,
 (b) source means for two tapes to be supplied to said assembling station,
 (c) means forming a sheet supply station for holding a plurality of sheets to be bound with said tapes,
 (d) means upstream from said assembling station for applying adhesive to one surface of each of said tapes,
 (e) means for guiding said two adhesive tapes to said assembling station in proper laterally spaced relation to receive one of said sheets therebetween,
 (f) first feeding means for advancing one of said sheets lengthwise from said sheet supply station into engagement with said tapes at said assembling station,
 (g) second feeding means for drawing said advanced sheet and said tapes through said assembling station and thereby drawing additional lengths of said tapes toward said assembling station,
 (h) said assembling station including means for folding said tapes into overlapping adhered relation with the respective side edges of said advanced sheet as said tapes and sheet travel through said assembling station,
 (i) means for causing recycling of both of said feeding means to form a web comprising a plurality of successive said sheets connected with each other by said tapes,
 (j) means for limiting the action of said feeding means to an incremental distance providing a predetermined margin between adjacent said sheets in said web, and
 (k) means downstream from said assembling station defining a cut-off station and including means for severing said tapes between the one said sheet at the downstream end of said web and the adjacent said sheet upstream thereof in said web in timed relation with said recycling means.

2. Apparatus as defined in claim 1 further comprising means located between said source means and said adhesive applying means for applying hinge means to one of said tapes.

3. Apparatus as defined in claim 1 wherein said second feeding means comprises a carriage mounted for linear reciprocating strokes between an upstream position adjacent said assembling station and a downstream position adjacent said cut-off station, and further comprising releasable means for clamping said web to said carriage during each said downstream stroke of said carriage and releasing said web from said carriage during each said upstream stroke of said carriage.

4. Apparatus as defined in claim 3 further comprising means for effecting operation of said first feeding means during each cycle of reciprocating movement of said carriage.

5. Apparatus as defined in claim 4 further comprising means on said carriage for engaging each successive said advanced sheet at the beginning of each said downstream stroke of said carriage to feed said sheet into assembled relation with said tapes during said downstream stroke of said carriage.

6. Apparatus as defined in claim 5 further comprising means for releasably holding each said advanced sheet during completion of each said upstream stroke of said carriage in position for engagement by said carriage upon the beginning of the subsequent said downstream stroke of said carriage.

7. Apparatus as defined in claim 3 further comprising additional releasable means for clamping said web to said cut-off station, means for operating said clamping means in alternating relation whereby said web is clamped to said carriage on each downstream stroke of said carriage and is clamped to said cut-off station during each upstream stroke of said carraige, and means for operating said severing means while said web is clamped to said cut-off station.

8. Apparatus as defined in claim 3 further comprising means for adjusting the length of said strokes of said carriage to correspond to sheets of different lengths.

9. Apparatus as defined in claim 1 further characterized in that said assembling station includes means for progressively folding said tapes into partially overlapping relation with the respective side edges of each said advanced sheet, and a plurality of pressure rolls for completing the folding of said tapes and adhesion thereof to each said sheet as said tapes and sheets travel through said assembling station.

10. Apparatus as defined in claim 1 wherein said adhesive applying means for each of said tapes comprises a fountain, means for supplying hot glue to said fountain, a glue-applying roller mounted for rotation in said fountain, and means for guiding said tape into partially wrapping relation with said roller.

11. Apparatus as defined in claim 10 further comprising means for driving each of said rollers in timed relation with said second feeding means.

12. Apparatus as defined in claim 10 further comprising means responsive to discontinuation of the operation of said apparatus for separating said tapes from said rollers.

13. Apparatus as defined in claim 1 further comprising means for adjusting said tape guiding means laterally of the path of said tapes therepast to correspond to sheets of different widths.

14. Apparatus as defined in claim 1 further characterized in that said severing means comprise a punch mounted at each side of said apparatus for reciprocating movement and having curved cutting edges for simultaneously cutting out the portion of tape connecting said one sheet and said adjacent sheet and also forming rounded edges on the adjacent corners of said adjacent sheets.

15. Apparatus for manufacturing, on an automatic continuous basis, successive album pages of predetermined length and width each of which comprises a base sheet having a reinforcing tape bound thereto in overlapping relation with each side edge thereof, comprising:
  (a) means defining a page assembling station,
  (b) source means for two tapes to be supplied to said assembling station,
  (c) means forming a sheet supply station for holding a plurality of sheets to be bound with said tapes,
  (d) means upstream from said assembling station for applying adhesive to one surface of each of said tapes,
  (e) means for guiding said two adhesive tapes to said assembling station in proper laterally spaced relation to receive one of said sheets therebetween,
  (f) said guiding means comprising two guide members arranged in pairs on opposite sides of said apparatus to define therebetween a path for said tapes and successive said sheets,
  (g) each of said guide members having a slot in the inner face thereof for receiving and progressively partially folding the associated said tape inwardly along the longitudinal center line thereof,
  (h) means for establishing the downstream pair of said guide members in predetermined spaced relation laterally of said apparatus corresponding to the desired width of said successive album pages,
  (i) first feeding means for advancing one of said sheets lengthwise from said sheet supply station into engagement with said partially folded tapes at said downstream pair of guide members,
  (j) second feeding means for drawing said advanced sheet and said tapes through said assembling station and thereby drawing additional lengths of said tapes toward said assembling station,
  (k) said assembling station including means for compressing said tapes into fully folded overlapping adhered relation with the respective side edges of said advanced sheet as said tapes and sheet travel through said assembling station,
  (l) means for causing recycling of both of said feeding means to form a web comprising a plurality of successive said sheets connected with each other by said tapes,
  (m) means for limiting the action of said feeding means to an incremental distance providing a predetermined margin between adjacent said sheets in said web, and
  (n) means downstream from said assembling station defining a cut-off station and including means for severing said tapes between the one said sheet at the downstream end of said web and the adjacent said sheet upstream thereof in said web in timed relation with said recycling means.

16. Apparatus as defined in claim 15 further comprising means for effecting relative lateral adjustment of said downstream pair of guide members to accommodate base sheets of predetermined different widths.

17. The method of manufacturing, on an automatic continuous basis, successive album pages of predetermined length and width each of which comprises a base sheet having a reinforcing tape bound thereto in overlapping relation with each side edge thereof, comprising the steps of:
    (a) applying adhesive to one surface of each of two said tapes,
    (b) guiding said two adhesive tapes to a page assembling station in proper laterally spaced relation to receive one of said sheets therebetween,
    (c) advancing one of said sheets lengthwise into engagement with said tapes at said assembling station,
    (d) drawing said advanced sheet and said tapes through said assembling station while folding said tapes into overlapping adhered relation with respective side edges of said advanced sheet and while drawing additional lengths of said tapes toward said assembling station,
    (e) causing said web to dwell upon completion of said drawing step,
    (f) repeating all of the foregoing said steps after said advanced sheet has travelled an incremental distance equal to at least the length thereof to form a web consisting of a plurality of successive said sheets connected with each other by said tapes, and
    (g) severing said tapes between the one said sheet at the downstream end of said web and the adjacent said sheet upstream thereof in said web during each said dwell.

18. The method defined in claim 17 further comprising the step of applying hinge means to one of said tapes in advance of said adhesive applying step.

19. The method defined in claim 17 further characterized in that each said sheet advancing step is carried out following the commencement of the preceding said drawing step and advances each successive said sheet to a predetermined position with respect to said assembling station.

* * * * *